June 21, 1966 W. S. FIEDLER 3,256,596
PROCESS FOR MAKING ARTICLE OF VITREOUS MATERIAL AND METAL
Filed Feb. 6, 1961
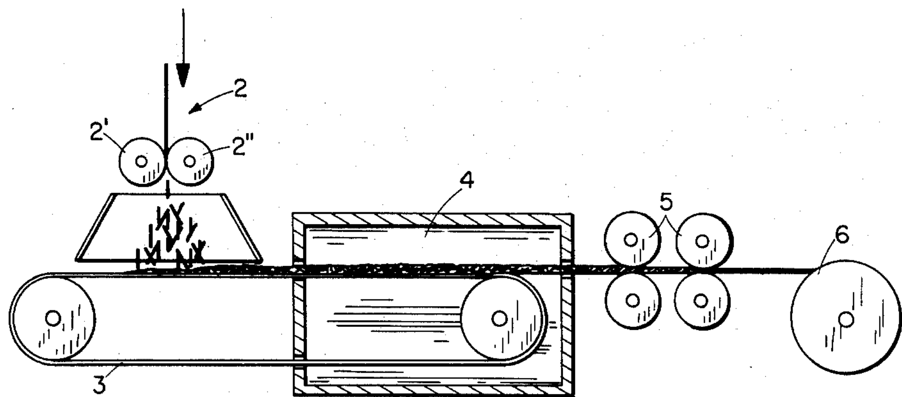
INVENTOR.
WILLIAM S. FIEDLER
BY [signature]
ATTORNEY United States Patent Office 3,256,596 Patented June 21, 1966

3,256,596

PROCESS FOR MAKING ARTICLE OF VITREOUS MATERIAL AND METAL

William S. Fiedler, 5149 Loruth Terrace, Madison, Wis.

Filed Feb. 6, 1961, Ser. No. 87,078
2 Claims. (Cl. 29—419)

This application relates to the subject matter of co-pending application Serial No. 496,228, having the same title, which said application in part discloses subject matter common with the disclosure hereof, now Patent No. 2,971,095, granted February 7, 1961.

This invention relates to articles comprising fibers of vitreous material such as glass fibers extending through matrixes of a metal such as lead and relates also to processes for producing such articles.

An object of the invention is an improved method for making an article comprising vitreous material and a metal, preferably glass fibers and lead.

Further objects will become apparent as the following detailed description proceeds.

In accordance with my invention, I apply a coating of a dense low melting material, such as lead, tin, bismuth, indium and the like, and alloys thereof, to glass fibers as these are being formed, then I may or may not randomize the fiber using any of the means known to the art, such as blowing chopped fiber, suspending chopped fiber and deposition of it on a felt; or by winding the continuous filaments in a random mat-like arrangement.

In any of these randomizing processes, a mat-like structure will result; however, this structure is too loose and mechanically weak for the purposes intended.

Alternatively, I orient the fibers in suitable patterns to obtain desired properties.

To strengthen, compact and stabilize the structure, I expose it to heat slightly below the melting point of the coating metal, and to pressure, so that the fibers are fused together by the coating metal, to form a compact mat of high density and strength. The metal coating prevents abrasion which would otherwise limit the wear characteristics of the metal fiber.

The invention is further illustrated by the figure which is a longitudinal diagrammatic view of the process and the article produced thereby, wherein metal coated vitreous fiber may be prepared with a coating by any of the metallizing means known to the art. Randomizing means 2 may consist of chopping rolls 2' and 2'' adapted to chop the fiber into small lengths. In any event, the fiber coated with heavy, low melting metal is spread out in a random, felt like (void-containing) arrangement on a conveying means 3. The loose mat thus produced is passed on to a heating means such as oven 4, and then, while still hot, is passed between pressure means such as calendar rolls 5, in order to press together the heated fibers, so as to cause the metal to fuse together substantially only at the points of contact to leave voids between the fibers and thus form a fabric, after which the material is wound upon mandrel 6. For heating I prefer to employ temperatures moderately below the melting point of the metal or alloy employed; I may even use temperatures slightly above the melting point of the metal, but preferably the temperature is not allowed to increase to the point where the coating begins to flow off the fibers.

Rather than be pressed together between rolls 5 the material may be made by being pressed in a press between plates or mold members or the like. The material after it passes through calendar rolls 5, instead of being wound mandrel 6, may be cut into sheets and stacked or otherwise prepared for storage or shipment in any suitable manner.

I have coated lead on glass fibers by various means which are now well known; a preferred method is to pass the fibers through a quantity of molten metal. These lead coated glass fibers have been laid up in both randomized and oriented bodies and then subjected to various pressures up to about 3,500 p.s.i. By this means they have been compacted into sheets and other forms in which there is a substantially homogenous dispersal of glass fibers throughout the sheets and also a substantially homogenous dispersal of lead throughout the sheets, the lead supplied only by the coatings on the glass fibers.

I have also succeeded in laminating (welding) such sheets to sheets of pure lead by means of similar pressures, that is, pressures up to 3,500 p.s.i., or from about 500 p.s.i. to 3,500 p.s.i.

I have also discovered that by raising the temperature of the lead coated glass fibers by any suitable means such as by the use of hot platens in a press I can suitably make these coated fibers into suitable articles at lower pressures. As an example, an article consisting of lead coated glass fibers compacted together and welded together by welding of the coatings at the points of contact of the coated fibers was formed at 500 p.s.i when the temperature of the material during compaction was held at about 150° C.

These materials are used as a radiation shield in the same applications as ordinary sheet lead or in other applications, the advantages of such use being in the increased resistance to fatigue caused by repeated stress and the greater strength of such materials as compared with pure lead.

It is sometimes advantageous to use an inert or reducing atmosphere; however, generally this is not necessary. I prefer to use lead, or alloys preponderantly based on lead for the coating material according to the invention, but I may also used tin, bismuth, antimony, indium and the like and the alloys of such metals.

I may also use, in less preferred embodiments, metal containing one or more of: aluminum, zinc, silicon, copper, cadmium, nickel, iron, titanium, chromium, molybdenum, magnesuim.

Articles according to the invention may be particularly well incorporated in batteries. Thus, a sheet of material made from 20–25 micron glass fibers coated with an alloy of lead containing 7% to 12% antimony is found particularly suitable as a plate in a lead acid battery, by reason of its relatively high tensile strength, resistance to destruction by shaking, vibration and impact, and because the network of glass fibers prevents lead and lead oxide particles from falling away from the plate. A plate used in this manner preferably contains 30 to 40% voids.

Filters prepared in accordance with the invention preferably contain voids in the amounts of 30 to 50%, but may contain from 5 to 80% voids so that metal and fibers taken together amount to from 95 to 20% by volume of the article. For most applications it is preferred that the volume occupied by voids be from 5 to 50% so that the volume of the article occupied by fibers and metal taken together is from 95% to 50%.

The relative proportions by volume of fibers to metal range from 20% fibers to 70% fibers.

Although I have hereinbefore described the manufacture of articles in accordance with the invention primarily by the method of subjecting a plurality of vitreous fibers coated with metal to heat and pressure, I may suitably prepare articles in accordance with the invention by casting molten metal in any well known manner into the interstices of a plurality of viterous fibers. If the fibers have not been previously coated with metal the proportion of voids will be higher and the strength of the material lower due to tendency of the metal to not wet the fibers. Alternatively the fibers may be precoated, in which case better adherence of metal to metal coated fibers is obtained, and consequently the tensile strength of the articles thus produced is greater and the volume of the article which is occupied by voids is less, i.e., the volume occupied by fibers and metal is greater.

As one of the methods of casting I may use vacuum castings, that is, I may cast the metal over fibers while both metal and fibers are maintained under vacuum, as is well known. A greater penetration of voids by the metal is thus obtained and an article made in accordance with the invention by this method has a relatively small percentage of voids.

The resultant mat is particularly useful for the preparation of radiation protective shields, clothing, filters and flexible laboratory shielding.

It is thus seen that the invention is broad in scope, and is not to be restricted excepting by the claims, in which it is my intention to include all novelty inherent in this invention as broadly as possible in view of prior art.

Having thus disclosed my invention, I claim:

1. The process of making a relatively flexible composite article which comprises the steps of first producing a plurality of vitreous fibers, then coating said vitreous fibers with metal wherein said metal is selected from lead and lead alloys, then bringing together a plurality of said fibers of viterous material coated with said metal into a group of said fibers, then heating said group of said fibers of viterous material coated with said metal to a temperature of about 150° C., then compacting and welding said group of coated fibers under pressure while maintaining said temperature, wherein said pressure is from 500 p.s.i. to 3,500 p.s.i.

2. The method of claim 1 wherein said pressure is about 500 p.s.i.

References Cited by the Examiner

UNITED STATES PATENTS

| | | | |
|---|---|---|---|
| 2,332,726 | 10/1943 | Joyce | 29—419 |
| 2,794,128 | 5/1957 | Shasky | 250—108 |
| 2,953,849 | 9/1960 | Morgan | 29—419 |
| 2,971,095 | 2/1961 | Drummond | 250—108 |
| 3,038,248 | 6/1962 | Kremer | 29—419 |

JOHN F. CAMPBELL, *Primary Examiner.*

RALPH G, NILSON, WHITMORE A. WILTZ, THOMAS H. EAGER, *Examiners.*

A. R. BORCHEL, *Assistant Examiner.*